US006767645B2

(12) United States Patent
Noritomi et al.

(10) Patent No.: US 6,767,645 B2
(45) Date of Patent: Jul. 27, 2004

(54) RELEASE PAPER

(75) Inventors: Katsumi Noritomi, Yamaguchi (JP); Kenichi Fukumoto, Komatsushima (JP)

(73) Assignees: Mitsui Chemicals, Inc., Tokyo (JP); Lintec Corporation, Tokyo (JP)

( * ) Notice: Subject to any disclaimer, the term of this patent is extended or adjusted under 35 U.S.C. 154(b) by 115 days.

(21) Appl. No.: 09/995,619

(22) Filed: Nov. 29, 2001

(65) Prior Publication Data

US 2002/0098370 A1 Jul. 25, 2002

(30) Foreign Application Priority Data

Nov. 29, 2000 (JP) .................................. 2000-362624

(51) Int. Cl.[7] .............................................. B32B 27/10
(52) U.S. Cl. ....................... 428/511; 427/257; 156/231; 156/230
(58) Field of Search .......................... 428/511; 427/257; 156/231, 230

(56) References Cited

U.S. PATENT DOCUMENTS

| 4,959,264 A | * | 9/1990 | Dunk et al. ............... 428/331 |
| 5,080,979 A | * | 1/1992 | Shigemoto et al. ......... 428/520 |
| 5,158,827 A | * | 10/1992 | Katagiri et al. ............ 428/332 |
| 5,807,621 A | * | 9/1998 | Kite et al. ................. 428/151 |

FOREIGN PATENT DOCUMENTS

| JP | 49 101503 | | 9/1974 |
| JP | 05-104694 | * | 4/1993 |
| JP | 06 322197 | | 11/1994 |
| JP | 07 133390 | | 5/1995 |
| JP | 8-25580 | | 1/1996 |
| JP | 08 025580 | | 1/1996 |
| JP | 03 100700 | | 10/2000 |

OTHER PUBLICATIONS

JP–05–104694 machine translation from JPO website, 1993.*
JP–08–025580 machine translation from JPO website, 1996.*
Properties of Standard TPX Grades, Mitsui website: mitsuichemicals.com/tpx_1.htm (undated).*

* cited by examiner

*Primary Examiner*—D. Lawrence Tarazano
(74) *Attorney, Agent, or Firm*—Birch, Stewart, Kolasch & Birch, LLP

(57) ABSTRACT

Disclosed herein is a release paper comprising:
  a paper base laminated with a release layer,
  this release layer comprising a 4-methyl-1-pentene resin being a copolymer of 4-methyl-1-pentene and an α-olefin other than 4-methyl-1-pentene wherein the α-olefin is contained in a proportion of 6 to 8% by weight. This release paper is excellent in heat resistance and exhibits less curling tendency in repeated use. Further, the release paper exhibits a high bonding strength between resin and paper, and is excellent in durability. The release paper is suitable for use in, for example, production of a synthetic leather.

19 Claims, No Drawings

RELEASE PAPER

FIELD OF THE INVENTION

The present invention relates to a release paper. More particularly, the present invention relates to a release paper which comprises a release layer of a specified 4-methyl-1-pentene resin and which can be appropriately used in, for example, production of a synthetic leather.

BACKGROUND OF THE INVENTION

Generally, synthetic leathers are produced by first coating a release paper having a relief pattern on its surface with a base resin such as polyurethane resin in liquid form, subsequently effecting drying to thereby obtain a resin layer on the release paper, thereafter bonding a base material such as cloth to the resin layer, and finally removing the release paper. The surface of thus produced synthetic leathers is in such a condition that the relief pattern of the surface of release paper has been transferred thereto.

The release paper for use in the above production of synthetic leathers must have excellent heat resistance and release capability. Therefore, in the release paper, a 4-methyl-1-pentene polymer whose melting point is as high as about 220 to 240° C. is used as a principal component of a release layer formed on a base such as paper.

For example, a paper base overlaid with poly-4-methyl-1-pentene by extrusion laminating is used as the release paper for synthetic leather. In the production of this release paper for synthetic leather, the release layer is embossed so that desired pattern is provided on the surface of the release layer. The intended synthetic leather can be produced by casting a resin for synthetic leather over the surface of the release layer and hardening the resin.

A release paper for synthetic leather production comprising a paper base laminated with a release layer constituted of a 4-methyl-1-pentene polymer composition comprising 80 to 97 parts by weight of 4-methyl-1-pentene polymer (A) and 3 to 20 parts by weight of ethylene/ethyl acrylate copolymer (B), was proposed in Japanese Patent Laid-open Publication No. 8(1996)-25580. According to this publication, the release layer of the release paper has excellent heat resistance and wettability, so that the release paper can be appropriately used even in the production of a synthetic leather from a water soluble or water dispersible resin.

There has been such a problem that, when the release paper is repeatedly used in the production of a synthetic leather or the like, the release paper curls into cylindrical form. Upon curling of the release paper, the work efficiency is poor in the reuse of the release paper, and, when forced elimination of curling is intended, the surface of the release paper may suffer from flaw or microcracking to thereby cause the reuse thereof to be difficult. The greater the thickness of the release layer of the release paper, the more serious the tendency toward these problems.

Therefore, there has been a strong demand for the development of a repeatedly usable release paper which is excellent in heat resistance and exhibits less curling tendency in repeated use and which exhibits a high bonding strength between resin and paper.

OBJECT OF THE INVENTION

It is an object of the present invention to provide a release paper which is excellent in heat resistance and exhibits less curling tendency in repeated use, which exhibits a high bonding strength between resin and paper and is excellent in durability, and which is suitable for use in, for example, production of a synthetic leather.

SUMMARY OF THE INVENTION

The release paper of the present invention comprises:

a paper base laminated with a release layer, the release layer comprising a 4-methyl-1-pentene resin being a copolymer of 4-methyl-1-pentene and an α-olefin other than 4-methyl-1-pentene wherein the α-olefin is contained in a proportion of 6 to 8% by weight.

With respect to the release paper of the present invention, it is preferred that the α-olefin have 10 to 20 carbon atoms. Preferably, the release paper is for use in production of a synthetic leather.

DETAILED DESCRIPTION OF THE INVENTION

The present invention will be described in detail below.

The release paper of the present invention comprises a paper base laminated with a release layer. Only one side of the paper base may be laminated with the release layer. Alternatively, both sides of the paper base may be laminated with the release layer.

<Release Layer>

The release layer as a constituent of the release paper of the present invention comprises a 4-methyl-1-pentene resin being a copolymer of 4-methyl-1-pentene and an α-olefin other than 4-methyl-1-pentene wherein the α-olefin is contained in a proportion of 6 to 8% by weight.

The α-olefin other than 4-methyl-1-pentene for constituting the 4-methyl-1-pentene resin can be, for example, any of α-olefins having 2 to 20 carbon atoms, such as ethylene, propylene, 1-butene, 1-hexene, 1-octene, 1-decene, 1-dodecene, 1-tetradecene, 1-hexadecene, 1-octadecene and 1-eicocene. At least one of these can be employed. Among them, an α-olefin having 10 to 20 carbon atoms is preferred. In particular, 1-decene, 1-dodecene, 1-tetradecene, 1-hexadecene, 1-octadecene and 1-eicocene are especially preferred.

It is preferred that the 4-methyl-1-pentene resin be a copolymer of 4-methyl-1-pentene and an α-olefin having 2 to 20 carbon atoms, especially 10 to 20 carbon atoms, from the viewpoint that the obtained release paper is highly flexible and is excellent in heat resistance.

In the 4-methyl-1-pentene resin for constituting the release layer in the present invention, the α-olefin is contained in a proportion of 6 to 8% by weight, preferably 6 to 7% by weight.

When the α-olefin content of the 4-methyl-1-pentene resin is as low as less than 6% by weight, the crystallinity and orientation coefficient of the 4-methyl-1-pentene resin tend to exhibit unfavorably large values. When the release paper including the release layer constituted of such 4-methyl-1-pentene resin is used in the production of a synthetic leather, the release layer may unfavorably be shrunk by heating in the process for producing the synthetic leather to thereby cause the release paper to curl.

On the other hand, when the α-olefin content of the 4-methyl-1-pentene resin is as high as more than 8% by weight, the heat resistance of the release layer resin may be unsatisfactory. When the release paper including the release layer constituted of such resin is used in the production of a synthetic leather, the embossed pattern provided on the release layer may unfavorably be flowed by heating in the process for producing the synthetic leather to thereby cause the repeated use of the release paper to be infeasible.

When the α-olefin content of the 4-methyl-1-pentene resin is in the range of 6 to 8% by weight, these problems can favorably be avoided to thereby enable the repeated use of the release paper.

With respect to the 4-methyl-1-pentene resin for use in the present invention, it is preferred that the melt flow rate (MFR) thereof as measured under a load of 5.0 kg at 260° C. according to ASTM D1238 be in the range of 1 to 400 g/10 min, especially 20 to 300 g/10 min, and still especially 50 to 200 g/10 min. The use of such 4-methyl-1-pentene resin is preferred from the viewpoint that laminating can be efficiently conducted at a high speed to thereby enhance the productivity of release paper, that a uniform thickness can be realized and the release layer can be free from cracking, and that a release paper which is excellent in the bonding strength between the release layer and the paper base layer can be easily produced.

In the present invention, the 4-methyl-1-pentene resin for constituting the release layer can be produced by copolymerizing 4-methyl-1-pentene and at least one of the above α-olefins according to known processes.

In the present invention, the 4-methyl-1-pentene resin may contain various additives customarily incorporated in polyolefins according to necessity in an amount not detrimental to the object of the present invention. Also, the 4-methyl-1-pentene resin may contain a small amount of resins other than the 4-methyl-1-pentene resin. Examples of the additives include a silane coupling agent, a weathering stabilizer, a thermal stabilizer, a slip agent, a nucleating agent, a pigment and a dye.

The thickness of the release layer of the 4-methyl-1-pentene resin, although not particularly limited, is preferably in the range of generally 5 to 200 μm, especially 20 to 100 μm. When the thickness of the release layer is in these preferable ranges, there may be obtained a satisfactory release property to a resin, such as the resin for synthetic leather, and, even if the smoothness of paper base is poor, the release layer can have smooth surface with the result that a synthetic leather of good surface condition can be obtained by the use of the release paper.

Thus formed release layer is excellent in the adherence to a paper base and in heat resistance, and exhibits a low resin orientation and a low crystallinity. The release paper of the present invention having such release layer is characterized by low shrinkage when exposed to heat in the production of a synthetic leather, less curling tendency upon repeated use, less pattern disappearing tendency, high bonding strength and prolonged durability.

<Paper Base>

In the present invention, a kraft paper, a wood free paper, a simili paper, an art paper, a coated paper or the like is used as the paper base. The thickness of the paper base, although not particularly limited, is preferably in the range of generally about 50 to 1000 μm, especially 100 to 350 μm.

<Release Paper>

The release paper of the present invention comprises the above paper base laminated with the release layer of the 4-methyl-1-pentene resin. Only one side of the paper base maybe laminated with the release layer. Alternatively, both sides of the paper base may be laminated with the release layer. The release paper of the present invention, although may be produced by any method, is preferably produced by laminating the paper base with the resin for constituting the release layer according to the extrusion laminating method. Further, the release paper of the present invention may have embossed pattern. The embossed pattern may be provided during the laminating of the paper base with the release layer or after the laminating. The embossed pattern can appropriately be provided by the use of customary embossing techniques.

According to necessity, the mixing of 4-methyl-1-pentene resin for constituting the release layer and optionally incorporated various additives can be performed by conventional methods using a mixer or a kneader. The employable mixer can be, for example, a V blender, a ribbon blender, a Henschel mixer or a tumbler blender. The employable kneader can be, for example, a single-screw extruder, a double-screw extruder, a kneader or a Banbury mixer.

The release paper of the present invention is preferably prepared by laminating the paper base with the release layer. In particular, it is preferred that the paper base be overlaid with the 4-methyl-1-pentene resin for constituting the release layer by extrusion lamination molding. The extrusion lamination molding can be accomplished by, for example, extruding the 4-methyl-1-pentene resin in molten form on the paper base by extrusion coating by means of customary extrusion laminators such as a single extrusion laminator or a coextrusion laminator. By this manner, the paper base can be laminated with the 4-methyl-1-pentene resin. The release paper obtained by laminating the paper base with the release layer by the extrusion lamination molding exhibits especially excellent bonding strength to thereby exhibit less tendency to invite peeling or other drawbacks even in the repeated use as the release paper for synthetic leather production or the like. Hence, the release paper ensures excellent durability.

The release paper of the present invention, by virtue of the structure wherein the paper base is laminated with the release layer constituted of the 4-methyl-1-pentene resin having an α-olefin content of 6 to 8% by weight, is characterized by reduced orientation of the release layer resin, low crystallinity thereof, less shrinkage when exposed to heating in the use in synthetic leather production or the like, satisfactory release property, excellent heat resistance, reduced curling even after repeated use and excellent durability.

The above release paper of the present invention is suitable for use in the production of a synthetic leather.

EFFECT OF THE INVENTION

The present invention enables providing a release paper which is excellent in heat resistance and exhibits less curling tendency in repeated use, which exhibits a high bonding strength between resin and paper, and is excellent in durability, and which is suitable for use in, for example, production of a synthetic leather.

EXAMPLE

The present invention will further be illustrated below with reference to the following Examples which in no way limit the scope of the invention.

In the following Examples and Comparative Examples, the crystallinity and orientation coefficient of the 4-methyl-1-pentene resin as the release layer of the release paper and the change of condition of release paper by heat cycle tests were evaluated in the following manner.

<Crystallinity>

The 4-methyl-1-pentene resin layer was peeled from the release paper to be evaluated. With respect to a sample of the thus obtained 4-methyl-1-pentene resin film, the X-ray profile thereof was produced by the transmission method effected under Cu target, 50 kV/300 mA and point focus conditions by means of X-ray diffractometer equipped with a rotary sample table (model Rint-2550 manufactured by Rigaku Denki Co., Ltd.). Crystalline portions were separated from noncrystalline portions on the resultant X-ray profile, thereby determining the crystallinity.

<Orientation Coefficient>

The 4-methyl-1-pentene resin layer was peeled from the release paper to be evaluated. With respect to a sample of the thus obtained 4-methyl-1-pentene resin film, the peak azimuth distribution curve on X-ray profile (200) face thereof was measured by the transmission method effected under Cu target, 40 kV/375 mA and point focus conditions by means of X-ray diffractometer equipped with a fibrous sample table (model Rint-2550 manufactured by Rigaku Denki Co., Ltd.). Orientation coefficient was determined therefrom.

<Condition of Release Paper Upon Heat Cycle Test>

Heat Cycle Test Condition

Each release paper was allowed to stand still in an oven at 190° C. for 2 min, taken out and cooled in room temperature atmosphere for 5 min, thereby completing one heat cycle. The same operation was performed five times (5 heat cycles). Each time, the condition of the release paper was evaluated.

Evaluation of Condition of Release Paper

In the heat cycle test, the condition of the release paper upon each time of heat cycle was visually evaluated on the following criteria:

1. Presence of curl
   A: no curling, and
   B: curling recognized.
2. Presence of crack
   A: no cracking, and
   B: cracking recognized.

Example 1

Extrusion lamination molding was carried out using a copolymer of 4-methyl-1-pentene and 1-octadecene (1-octadecene content: 7.0% by weight and MFR: 100 g/10 min) as the 4-methyl-1-pentene resin and using a wood free paper as the paper base under the following molding conditions, thereby obtaining a release paper having a 30 μm thick release layer (4-methyl-1-pentene resin layer).

Extrusion Lamination Molding Condition cylinder temperature:
C1/C2/C3/C4/XH/FP/die=300/350/320/320/320/320/320° C.,
die width: 800 mm, and
molding speed: 120 m/min.

With respect to the thus obtained release paper, the crystallinity and orientation coefficient of the release layer resin were determined before and after a heat history at 190° C. for 2 min. The results are shown in Table 1.

Further, the heat cycle test of obtained release paper was performed under the above test conditions corresponding to the conditions for synthetic leather production, and the condition of release paper (presence of curls and presence of cracks) was evaluated. The results are shown in Table 2.

Example 2

A release paper having a 90 μm thick release layer (4-methyl-1-pentene resin layer) was produced in the same manner as in Example 1 except that, with respect to the extrusion lamination molding conditions, the molding speed was changed to 40 m/min.

The heat cycle test of obtained release paper was performed, and the condition of release paper (presence of curls and presence of cracks) was evaluated. The results are shown in Table 2.

Comparative Example 1

A release paper having a 30 μm thick release layer (4-methyl-1-pentene resin layer) was produced in the same manner as in Example 1 except that a copolymer of 4-methyl-1-pentene and 1-decene (1-decene content: 2.80% by weight and MFR: 180 g/10 min) was used as the 4-methyl-1-pentene resin.

With respect to the thus obtained release paper, the crystallinity and orientation coefficient of the release layer resin were determined before and after a heat history at 190° C. for 2 min. The results are shown in Table 1.

The heat cycle test of obtained release paper was performed, and the condition of release paper (presence of curls and presence of cracks) was evaluated. The results are shown in Table 2.

Comparative Example 2

A release paper having a 90 μm thick release layer (4-methyl-1-pentene resin layer) was produced in the same manner as in Comparative Example 1 except that, with respect to the extrusion lamination molding conditions, the molding speed was changed to 40 m/min.

The heat cycle test of obtained release paper was performed, and the condition of release paper (presence of curls and presence of cracks) was evaluated. The results are shown in Table 2.

Comparative Example 3

A release paper having a 30 μm thick release layer (4-methyl-1-pentene resin layer) was produced in the same manner as in Example 1 except that a copolymer of 4-methyl-1-pentene and 1-tetradecene (1-tetradecene content: 5.0% by weight and MFR: 25 g/10 min) was used as the 4-methyl-1-pentene resin.

With respect to the thus obtained release paper, the crystallinity and orientation coefficient of the release layer resin were determined before and after a heat history at 190° C. for 2 min. The results are shown in Table 1.

The heat cycle test of obtained release paper was performed, and the condition of release paper (presence of curls and presence of cracks) was evaluated. The results are shown in Table 2.

Comparative Example 4

A release paper having a 90 μm thick release layer (4-methyl-1-pentene resin layer) was produced in the same manner as in Comparative Example 3 except that, with respect to the extrusion lamination molding conditions, the molding speed was changed to 40 m/min.

The heat cycle test of obtained release paper was performed, and the condition of release paper (presence of curls and presence of cracks) was evaluated. The results are shown in Table 2.

TABLE 1

| | Copolymer α-olefin | | Heat history | Crystallinity (%) | Orientation coeff. |
|---|---|---|---|---|---|
| | type | content (wt. %) | | | |
| Example 1 | 1-octadecene | 7.0 | before | 22 | 0.00 |
| | | | after | 37 | 0.03 |
| Comp. Ex. 1 | 1-decene | 2.8 | before | 28 | 0.03 |
| | | | after | 44 | 0.01 |
| Comp. Ex. 3 | 1-tetradecene | 5.0 | before | 26 | 0.08 |
| | | | after | 43 | 0.08 |

TABLE 2

| | Copolymer α-olefin type (content: wt. %) | Thickness of release layer (μm) | Evaluated item | No. of heat cycles | | | | |
|---|---|---|---|---|---|---|---|---|
| | | | | 1 | 2 | 3 | 4 | 5 |
| Example 1 | 1-octadecene (7.0) | 30 | curling | A | A | A | A | A |
| | | | cracking | A | A | A | A | A |
| Example 2 | 1-octadecene (7.0) | 90 | curling | A | A | A | A | A |
| | | | cracking | A | A | A | A | A |
| Comp. Ex. 1 | 1-decene (2.8) | 30 | curling | B | B | B | B | B |
| | | | cracking | B | B | B | B | B |
| Comp. Ex. 2 | 1-decene (2.8) | 90 | curling | B | B | B | B | B |
| | | | cracking | B | B | B | B | B |
| Comp. Ex. 3 | 1-tetradecene (5.0) | 30 | curling | B | B | B | B | B |
| | | | cracking | A | B | B | B | B |
| Comp. Ex. 4 | 1-tetradecene (5.0) | 90 | curling | B | B | B | B | B |
| | | | cracking | A | A | B | B | B |

It is apparent from Table 1 that the release paper having the release layer of the 4-methyl-1-pentene resin having an α-olefin content of 6 to 8% by weight, obtained in Example 1, exhibits simultaneously low values with respect to the crystallinity and orientation coefficient of release layer resin before and after the heat history, and is excellent in flexibility and heat resistance.

It is also apparent from Table 2 that the release papers of Examples 1 and 2 having the release layer of the above resin are free from curling and cracking even after the heat cycle test wherein five heat cycles were conducted, are free from peeling between the resin layer and the paper layer and are excellent in durability. On the other hand, the release papers of Comparative Examples having release layers of 4-methyl-1-pentene resins having an α-olefin content falling outside the range of 6 to 8% by weight, without exception, are curled and cracked by the heat cycle test and have poor heat resistance and durability.

From these results, it is apparent that the release paper having the release layer of the 4-methyl-1-pentene resin having a specified α-olefin content according to the present invention is excellent in heat resistance and durability and is suitable for use in the production of a synthetic leather wherein a heating step is inevitable.

What is claimed is:

1. A release paper comprising:
   a paper base laminated with a release layer,
   said release layer comprising a 4-methyl-1-pentene resin being a copolymer of 4-methyl-1-pentene and an α-olefin other than 4-methyl-1-pentene wherein the α-olefin is contained in a proportion of 6 to 8% by weight.

2. The release paper according to claim 1, wherein the paper base is laminated on only one side of the release paper.

3. The release paper according to claim 1, wherein the paper base is laminated on both sides of the release paper.

4. The release paper according to claim 1, wherein the α-olefin other than 4-methyl-1-pentene is one or more members selected from the group consisting of ethylene, propylene, 1-butene, 1-hexene, 1-octene, 1-decene, 1-dodecene, 1-tetradecene, 1-hexadecene, 1-octadecene and 1-eicocene.

5. The release paper according to claim 1, further comprising an additive selected from the group consisting of a silane coupling agent, a weathering stabilizer, a thermal stabilizer, a slip agent, a nucleating agent, a pigment and a dye.

6. The release paper according to claim 1, wherein the release layer has a thickness of 5 to 200 μm.

7. The release paper according to claim 1, wherein the release layer has a thickness of 20 to 100 μm.

8. The release paper according to claim 1, wherein the paper base has a thickness of 50 to 1000 μm.

9. The release paper according to claim 1, wherein the paper base has a thickness of 100 to 350 μm.

10. The release paper as claimed in claim 1, wherein the α-olefin has 10 to 20 carbon atoms.

11. The release paper according to claim 10, wherein the paper base is laminated on only one side of the release paper.

12. The release paper according to claim 10, wherein the paper base is laminated on both sides of the release paper.

13. The release paper according to claim 10, wherein the α-olefin other than 4-methyl-1-pentene is one or more members selected from the group consisting of 1-decene, 1-dodecene, 1-tetradecene, 1-hexadecene, 1-octadecene and 1-eicocene.

14. The release paper according to claim 10, further comprising an additive selected from the group consisting of a silane coupling agent, a weathering stabilizer, a thermal stabilizer, a slip agent, a nucleating agent, a pigment and a dye.

15. The release paper according to claim 10, wherein the release layer has a thickness of 5 to 200 μm.

16. The release paper according to claim 10, wherein the release layer has a thickness of 20 to 100 μm.

17. The release paper according to claim 10, wherein the paper base has a thickness of 50 to 1000 μm.

18. The release paper according to claim 10, wherein the paper base has a thickness of 100 to 350 μm.

19. A process of producing synthetic leather comprising:

coating a base resin onto a release surface layer of a release paper comprising a paper base laminated with a release layer wherein said release layer comprises 4-methyl-1-pentene resin being a copolymer of 4-methyl-1-pentene and an α-olefin other than 4-methyl-1-pentene wherein the α-olefin is contained in a proportion of 6 to 8% by weight, drying the coated base resin to thereby obtain a resin layer on the release layer, bonding a base material to the resin layer, and removing the release paper from the resin layer.

* * * * *